I. E. & R. Q. LINCOLN.
COOKING UTENSIL.
APPLICATION FILED FEB. 10, 1909.

931,209.

Patented Aug. 17, 1909.

Witnesses:
C. J. Williams
M. A. Palmer

Inventors,
Isabelle E. Lincoln.
Robert Q. Lincoln.

Howard & Krause
Attorneys.

UNITED STATES PATENT OFFICE.

ISABELLE E. LINCOLN AND ROBERT Q. LINCOLN, OF LOS ANGELES, CALIFORNIA.

COOKING UTENSIL.

No. 931,209.  Specification of Letters Patent.  Patented Aug. 17, 1909.

Application filed February 10, 1909. Serial No. 477,059.

*To all whom it may concern:*

Be it known that we, ISABELLE E. LINCOLN and ROBERT Q. LINCOLN, citizens of the United States, residing at Los Angeles, in the county of Los Angeles and State of California, have invented new and useful Improvements in Cooking Utensils, of which the following is a specification.

Our invention relates more particularly to that class of utensils known as broilers, toasters and like structures wherein two complementary skeleton wire frames are pivoted together, and an object thereof is to provide a utensil that may be expeditiously used in combination with "frying pans" and similar structures for turning several articles of food at one time that may be cooking therein.

In the accomplishment of the above objects we preferably employ two circular wire frames suitably pivoted together, the handles attached thereto adapting it for use with shallow covered cooking vessels.

Figure 1:
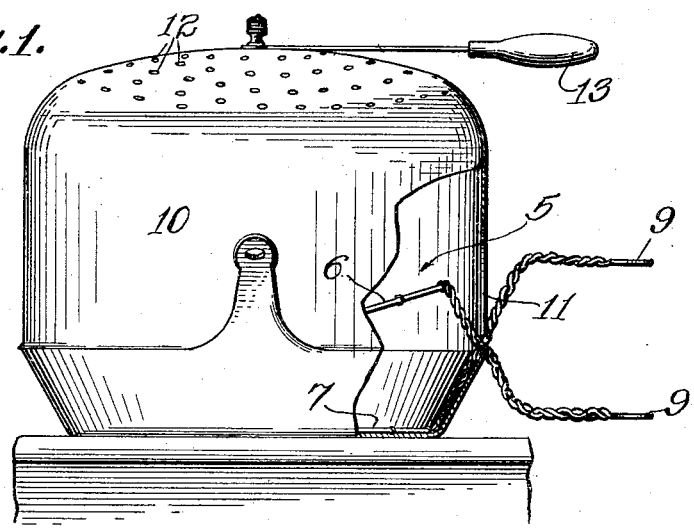
Figure 2:
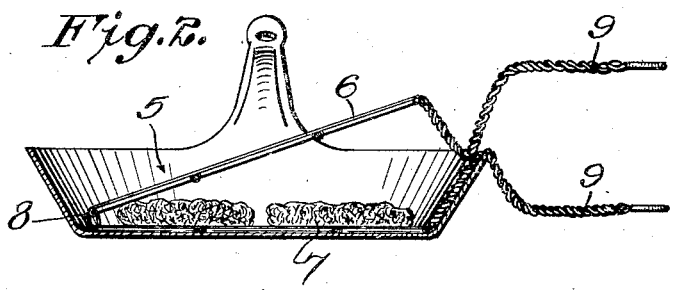
Figure 3:
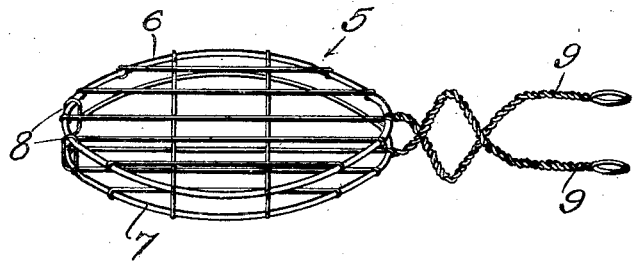

In the drawings attached hereto and forming a part of this specification, Figure 1— is a side elevation of a frying pan provided with a cover with our improved utensil in place therein, portions of the cover and pan being broken away for clarity of illustration. Fig. 2— is a cross section of a "frying" pan showing the placement of our improved utensil. Fig. 3— is a perspective view of our utensil.

Referring more particularly to the drawings, 5 designates a skeleton structure preferably formed of aluminum wire and consisting of two members 6 and 7 pivoted together as at 8, each member being provided with a handle 9 also formed of wire and preferably secured to the members 6 and 7 at a point opposite the pivots 8. These handles, instead of extending outwardly in the same plane of members 6 and 7, as is usual in utensils of this character, are bent at or adjacent their points of attachment to the members at angles opposite to each other, so that when the members 6 and 7 are in the same parallel plane, as illustrated in Fig. 3, the bent portions of each handle will be of a general V-shaped form, enabling us to place the utensil in a frying pan as illustrated in Figs. 1 and 2 of the drawings, the general V-shaped form of the handle permitting the lower member to rest lightly on the bottom of the pan while the vertex of the angle formed in the upper handle will rest lightly against the upper edge of the side of the pan.

In Fig. 1 we have shown our improved utensil applied to a shallow vessel provided with a cover 10 preferably circular in form and having a vertically extending slot 11, by means of which when it is desired to rotate the utensil 5, it may be accomplished without raising the cover, thus preventing the spattering of the cook with grease from the vessel. The cover 10 is preferably provided with a plurality of perforations 12 which will permit of the escape of steam generated within the vessel, a handle 13 secured to the center of the cover permitting the removal of the cover without subjecting the hands to steam or heat.

It will be observed from the foregoing description that we have provided a novel cooking utensil, whereby several articles of food such as chops, steaks, meat balls and "hamburger steaks" which are being cooked in a shallow pan may be readily turned at the same time from one side to the other as required, thus obviating the necessity of separately turning each individual piece, and preventing the accidental distribution or spattering of hot grease from the pan to the stove or person's clothing.

Having described our invention what we claim as new and desire to secure by Letters Patent is:—

A cooking utensil, comprising two complementary wire frames pivoted together at one side thereof, and a pair of handles rigidly secured to said frames and projecting outwardly in the planes of the respective frames, each handle having near its point of attachment to its frame a V-shaped bend, these bends being reversely directed and at right angles to the planes of the frames, whereby when the device is used in a pan, the edge of the pan would take up into the V-shaped bend and permit the device to lie flatly in the pan.

In witness that we claim the foregoing we have hereunto subscribed our names this 2d day of February, 1909.

ISABELLE E. LINCOLN.
ROBT. Q. LINCOLN.

Witnesses:
EDMUND A. STRAUSE,
M. A. PALMER.